UNITED STATES PATENT OFFICE.

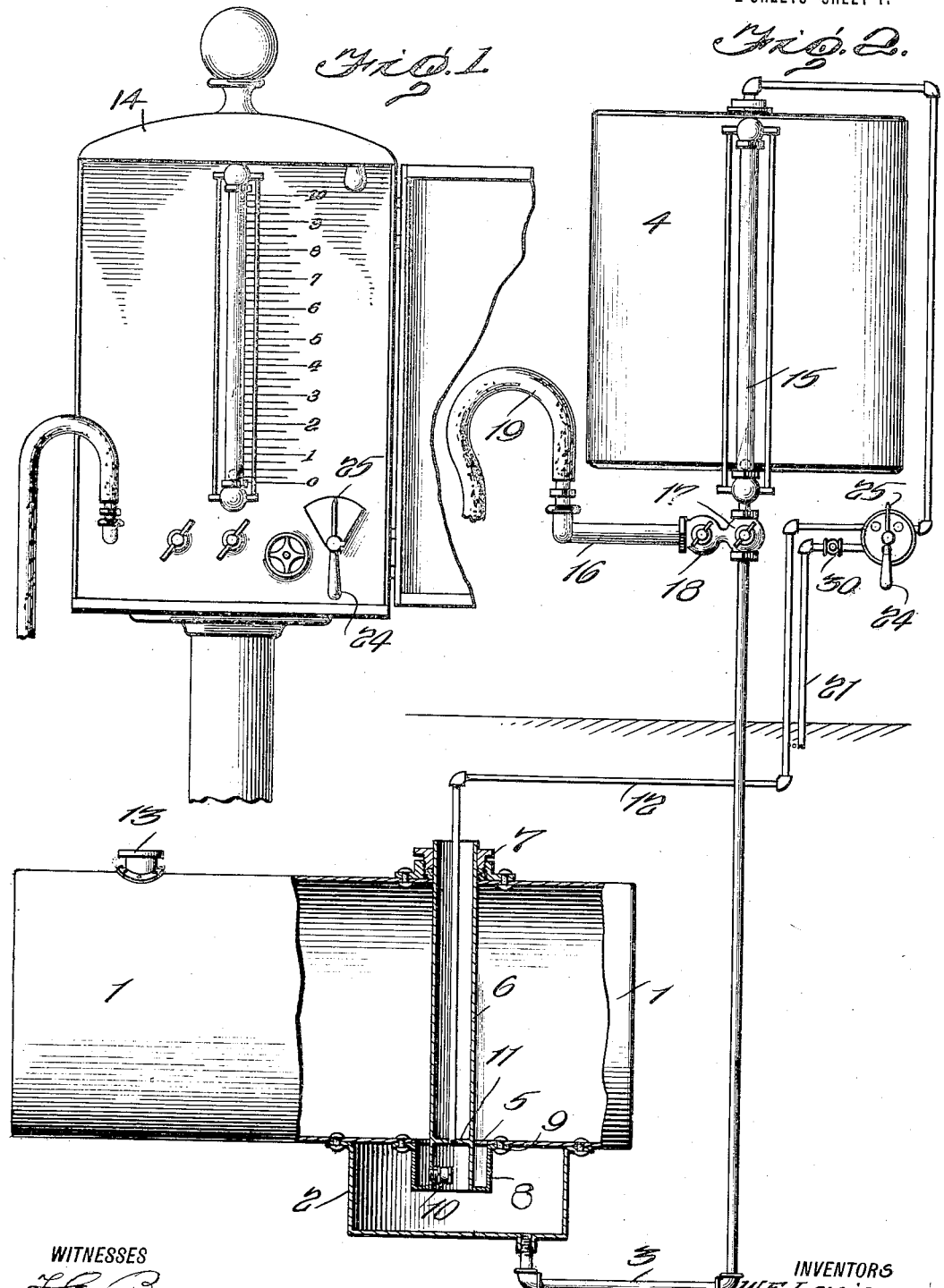

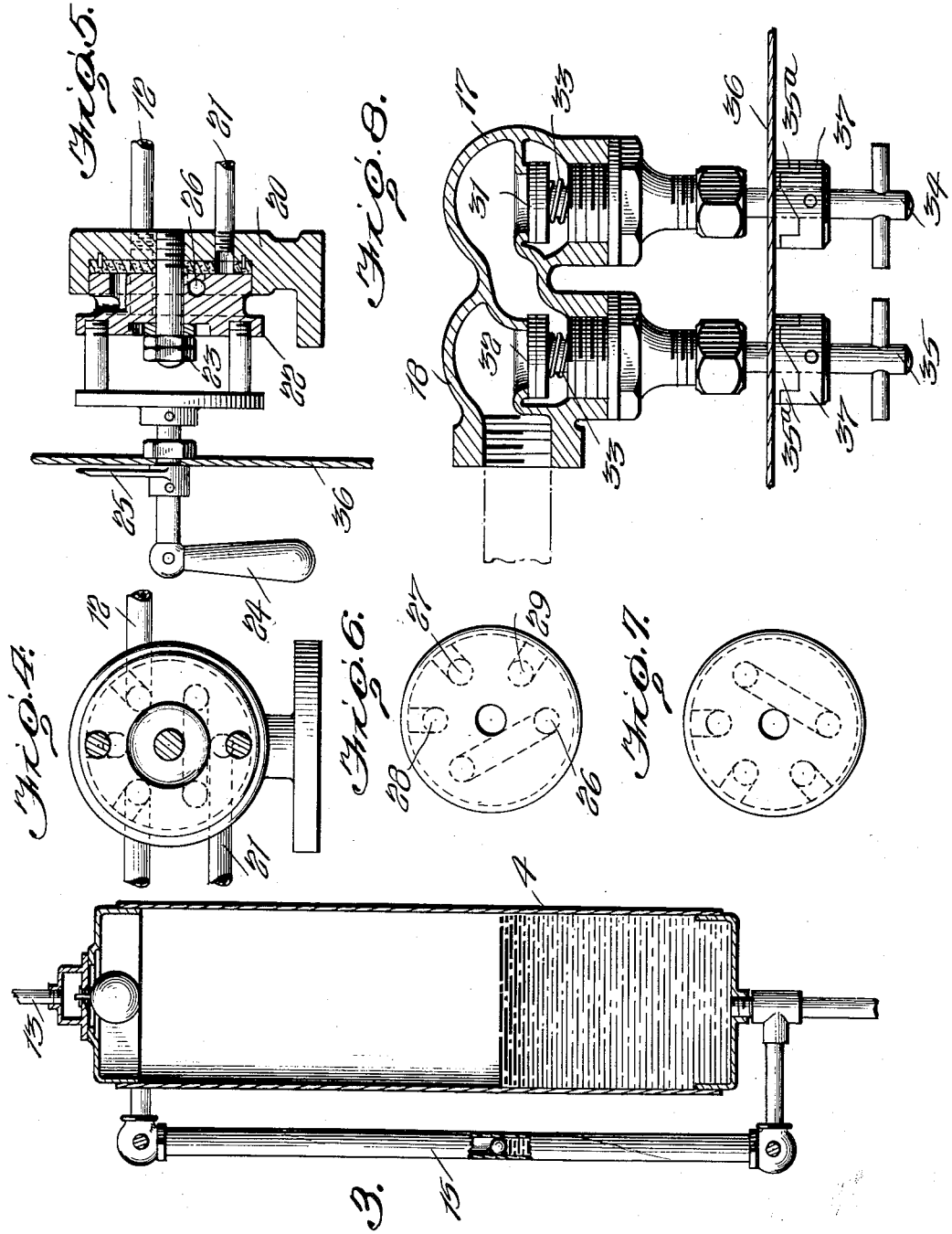

WILLIAM EDWARD LEVISAY AND CHARLES ANDREW LEVISAY, OF COVINGTON, VIRGINIA.

GASOLENE-TANK.

1,287,362.	Specification of Letters Patent.	Patented Dec. 10, 1918.

Application filed April 3, 1917.  Serial No. 159,415.

*To all whom it may concern:*

Be it known that we, WILLIAM E. LEVISAY and CHARLES A. LEVISAY, citizens of the United States, and residents of Covington, in the county of Alleghany and State of Virginia, have invented certain new and useful Improvements in Gasolene-Tanks, of which the following is a specification.

Our invention is an improvement in gasolene tanks, and has for its object to provide mechanism for permitting any specified amount to be withdrawn from the storage tank into the measuring tank and to be afterward discharged into a supply tank, all of the gasolene being held in an underground storage tank so that only the actual quantity needed may be delivered.

In the drawings:

Figure 1 is a front view of the measuring tank,

Fig. 2 is a side view of the measuring and storage tank with parts in section,

Fig. 3 is a vertical section through the measuring tank,

Fig. 4 is a front view of the valve,

Fig. 5 is a cross section,

Figs. 6 and 7 are front views of the valve removed, and

Fig. 8 is a sectional view through the casing of the filling and discharging valve for the measuring tank.

In the present embodiment of the invention a supply tank 1 is, as usual, arranged beneath the surface of the ground, and an auxiliary tank 2 is arranged below the main supply tank. A discharge pipe 3 leads from the auxiliary tank to the measuring tank 4, and the main tank communicates with the auxiliary tank through an opening 5 in the bottom of the main tank. A pipe 6 extends through a packing 7 in the top of the main tank, and through the opening 5, and this pipe 6 extends through the opening 5 at its lower end and has a backwardly turned portion or petticoat 8 which has a marginal flange 9 secured on the wall of the tank 1 around the opening 5.

A check valve 10 is arranged in the wall of the pipe 6 communicating with the space between the said pipe and the petticoat, and the valve is arranged to permit the gasolene to flow freely from the main tank to the auxiliary tank and to prevent the return flow. The pipe 6 has a transverse partition 11 at the level of the bottom of the tank 1, and an air pipe 12 which passes downward through the pipe 6 is threaded through an opening in the said partition. This pipe 12 is the air supply pipe for the auxiliary tank for forcing the gasolene into the measuring tank to be described. The storage tank 1 has a supply opening 13 by means of which the supply of gasolene may be renewed when desired.

The measuring tank 4, which is arranged within a suitable casing 14, has a gage 15 for indicating the amount of gasolene therein, and the air pipe 12 before mentioned, opens into the top of the said tank 4. A discharge pipe 16 is connected with the pipe 3 just below the bottom of the measuring tank, and a valve casing 17 is arranged within the pipe 3 just before it enters the tank. A second casing 18 is arranged between the discharge pipe 16 and the valve 17, and the pipe 16 has the usual hose or flexible pipe 19 for discharging the contents of the tank into the tank of an automobile. An air valve casing 20, to be described in detail, is interposed in the length of the pipe 12, and a suitable air supply pipe 21 is connected therewith.

The valve 22 within the casing is rotatably held by a screw bolt 23 and a handle 24 is provided for manipulating the valve, the handle having a pointer 25. The valve has ports or passages 26, 27, 28 and 29, for connecting the pipe 21 with either end of the pipe 12, that is, with the tank 4, or with the storage tank, and by means of the valve the source of air supply which is connected with the pipe 21, may be connected with either end of the pipe 12, that is with the auxiliary tank 2 or with the measuring tank 4. The ports 27, 28 and 29 are exhaust ports open to the atmosphere, and a check valve 30 is provided in the pipe 21.

Valves 31 and 32 are arranged within the casings 17 and 18, and the said valves are normally spring pressed toward their seats by coil springs 33 which encircle the stems 34 and 35 of the valve. Each of the stems 34 and 35 has a handle at its outer end, and means is provided for holding either valve open against the pressure of the spring. The said means, as shown in Fig. 8, is a collar 35ᵃ secured to the face 36 of the indicating mechanism, and having cam teeth which are engaged by similar teeth on the collar 37 pinned to the stem. The valve 31 affords a means for placing the auxiliary or pressure tank 2 in communication with the measuring tank 4, while the valve 32 affords a means for placing the measuring tank in communication with the discharge pipe 16—19.

When the valve 31 is opened and the valve 22 is properly placed to connect the auxiliary tank with the source of air supply through the valve 22, the gasolene in the auxiliary tank 2 will be driven into the measuring tank. When the valve 32 is open and the valve 22 is turned to place the pipe 21 in communication with the upper portion of the pipe 12, that is, in communication with the measuring tank, the gasolene will be driven out of the measuring tank into the tank of an automobile, or other container. When the valve 22 is turned to place the source of air supply in communication with the tank 2, the tank 4 is placed in communication with the atmosphere, while when the valve is turned to place the tank 4 in communication with the source of supply, the tank 2 is placed in communication with the atmosphere so that the said tank will fill from the tank 1.

We claim:

A device of the character specified comprising a storage tank, an auxiliary tank below the storage tank, a check controlled port leading from the storage tank to the auxiliary tank, a measuring tank having a gage, a source of fluid under pressure, connections between the auxiliary tank, the measuring tank and the source of fluid supply for permitting the fluid pressure to be admitted to the auxiliary tank or to the measuring tank to drive the fuel from the said tanks, a fuel pipe connection between the auxiliary tank and the measuring tank and having a discharge, valves for controlling the said fuel pipe and the discharge, and a valve for controlling the fluid pressure supply to the auxiliary tank and to the measuring tank.

WILLIAM EDWARD LEVISAY.
CHARLES ANDREW LEVISAY.

Witnesses:
CHAS. E. HILL,
PATRICK C. DRISCOLL.